United States Patent [19]

Antonelli et al.

[11] Patent Number: 4,591,533

[45] Date of Patent: May 27, 1986

[54] COATING COMPOSITION OF AN ACRYLIC POLYMER, A DISPERSED ACRYLIC POLYMER AND AN ALKYLATED MELAMINE CROSSLINKING AGENT

[75] Inventors: Joseph A. Antonelli, Riverton; Isidor Hazan, Clementon, both of N.J.

[73] Assignee: E. I. Du Pont de Nemours and Company, Wilmington, Del.

[21] Appl. No.: 740,895

[22] Filed: Jun. 3, 1985

[51] Int. Cl.[4] .................. B32B 27/08; C08L 61/28
[52] U.S. Cl. .................. 428/520; 427/407.1; 427/410; 428/460; 428/463; 428/515; 524/512; 524/902; 525/161; 525/162; 525/163
[58] Field of Search .............. 525/161, 74, 162, 187, 525/193, 385; 524/512, 517; 428/460, 463, 515, 520

[56] References Cited

U.S. PATENT DOCUMENTS

| | | | |
|---|---|---|---|
| 3,919,351 | 11/1975 | Chang et al. | 260/850 |
| 3,975,457 | 11/1976 | Chang et al. | 260/859 |
| 4,208,494 | 6/1980 | Chang et al. | 525/440 |
| 4,208,495 | 6/1980 | Chang et al. | 525/440 |
| 4,291,137 | 9/1981 | Nakate et al. | 525/161 |
| 4,330,458 | 5/1982 | Spinelli et al. | 524/512 |
| 4,346,144 | 8/1982 | Craven | 524/517 |
| 4,415,697 | 11/1983 | Peng et al. | 524/512 |

*Primary Examiner*—Theodore E. Pertilla
*Attorney, Agent, or Firm*—Hilmar L. Fricke

[57] ABSTRACT

A coating composition that is used primarily as a clear finish over a colored or pigmented finish that are applied to automobile and truck bodies; the composition contains as the film forming binder (a) an acrylic polymer
(b) a self stabilized dispersed resin formed by polymerizing in solution the following constituents:
 (1) an acrylic solution polymer,
 (2) monomers of alkyl methacrylate or acrylate and hydroxy ethyl acrylate or methacrylate, wherein either the acrylic solution polymer contains post reacted glycidyl methacrylate or acrylate or the monomers contain glycidyl methacrylate or acrylate, and
(c) an alkylated melamine formaldehyde crosslinking agent.

17 Claims, No Drawings

COATING COMPOSITION OF AN ACRYLIC POLYMER A DISPERSED ACRYLIC POLYMER AND AN ALKYLATED MELAMINE CROSSLINKING AGENT

BACKGROUND OF THE INVENTION

This invention is related to a coating composition useful for finishing automobiles and trucks.

One particular finish that provides an excellent aesthetic appearance is being used widely on automobiles and trucks has a colored base coat which contains pigments and a clear topcoat which is unpigmented. There is a need for a clear topcoating composition that has excellent durability, weatherability and adhesion to a colored base coat and provides a finish with an excellent aesthetic appearance.

SUMMARY OF THE INVENTION

A coating composition comprising about 20–85% by weight of film forming binder and 15–85% by weight of an organic liquid carrier; wherein the binder contains
(a) an acrylic polymer I of polymerized monomers of alkyl methacrylate, alkyl acrylate, hydroxy alkyl acrylate or methacrylate and has a weight average molecular weight of about 3,000 to 20,000;
(b) a self stabilized dispersed resin formed by polymerizing the following constituents:
  (1) an acrylic polymer II of polymerization monomers comprising alkyl methacrylate, alkyl acrylate, hydroxy alkyl acrylate or methacrylate, an ethylenically unsaturated carboxylic acid and has a weight average molecular weight of about 3,000–20,000;
  (2) monomers of alkyl methacrylate, alkyl acrylate, hydroxy alkyl acrylate or methacrylate; wherein either acrylic polymer II contains glycidyl methacrylate or acrylate monomers post reacted with the carboxylic acid or the monomers contain glycidyl methacrylate or acrylate;
(c) an alkylated melamine formaldehyde crosslinking agent

DETAILED DESCRIPTION OF THE INVENTION

The coating composition has a film forming binder content of about 20–85% by weight and corresponding about 15–80% by weight of a liquid carrier. Preferably, the coating composition is a high solids composition that contains about 50–80% by weight of the binder and 20–50% by weight of organic solvent for the binder. The binder of the composition preferably is a blend of about 5–75% by weight of an acrylic polymer I, and 5–45% by weight of a self stabilized dispersed resin and 20–50%, by weight of an alkylated melamine formaldehyde crosslinking agent.

The acrylic polymer I is of polymerized monomers of an alkyl methacrylate, an alkyl acrylate, hydroxy alkyl acrylate or methacrylate and has a weight average molecular weight of about 3,000–20,000. Preferably, styrene is used with the above monomers in acrylic polymer I.

Molecular weight is measured by gel permeation chromatography using polymethyl methacrylate as a standard.

Typical alkyl methacrylates used to form the acrylic polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Typical alkyl acrylates used to form the acrylic polymer are methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Typical hydroxy alkyl acrylates and methacrylates are hydroxy ethyl acrylate, hydroxy propyl acrylate, hydroxy isopropyl acrylate, hydroxy butyl acrylate, hydroxy ethyl methacrylate, hydroxy propyl methacrylate, hydroxy isopropyl methacrylate, hydroxy butyl methacrylate and the like and mixtures of the above monomers.

Preferably, the acrylic polymer I is composed of 5–30% by weight styrene, 10–40% by weight butyl methacrylate 10–40% by weight butylacrylate, 15–50% by weight of hydroxyethyl acrylate or hydroxy propyl acrylate and has a weight average molecular weight of about 5,000–15,000. Optionally, the polymer can contain about 0.1–5% by weight of acrylic acid or methacrylic acid.

The acrylic polymer I is prepared by solution polymerization in which the monomers, conventional solvents, polymerization initiators, such as peroxy acetate are heated to about 90°–250° C. for 1–6 hours.

The self-stabilized dispersed resin is formed by polymerizing in solution the following constituents:
(1) an acrylic polymer II;
(2) monomers of alkyl acrylate, alkyl methacrylate, and hydroxy acrylate or methacrylate. Conventional polymerization initiators such as t-butyl peracetate, and solvents are used. The constituents are heated to about 80°–250° C. for about 1–6 hours to form the resin.

The solution acrylic polymer II is composed of polymerization monomers of alkyl methacrylate, alkyl acrylate, hydroxy alkyl acrylate or methacrylate and an ethylenically unsaturated carboxylic acid and optionally, monomers of styrene. Any of the aforementioned alkyl acrylates, methacrylates, hydroxy alkyl acrylates or methacrylates can be used to prepare the polymer. Typical ethylenically unsaturated carboxylic acids that can be used are acrylic acid and methacrylic acid. Preferably, styrene is used to form the polymer with the above monomers.

One preferred polymer contains about 5–25% by weight styrene, 20–40% by weight butyl acrylate, 20–40% butyl methacrylate, 5–15% by weight hydroxy ethyl acrylate, 1–5% by weight acrylic acid and 10–20% by weight ethyl methacrylate and has a weight average molecular weight of about 7,000–15,000.

Another preferred polymer contains about 5–25% by weight styrene, 25–35% by weight butyl methacrylate, 20–40% by weight butyl acrylate, 5–15% by weight hydroxy ethyl acrylate, 1–5% by weight acrylic acid, 10–20% by weight ethyl methacrylate and 1–5% by weight glycidyl methacrylate post reacted with acrylic acid and has a weight average molecular weight of about 7,000–15,000.

Conventional polymerization techniques as described above for acrylic Polymer I are used to prepare acrylic Polymer II.

Glycidyl methacrylate or acrylate is either post reacted with the carboxyl groups of acrylic polymer II or is one of the monomers that are polymerized with acrylic polymer II.

Any of the aforementioned alkyl methacrylates, alkyl acrylates, hydroxy alkyl acrylates or methacrylates, ethylenical unsaturated acids are monomers that can be used to prepare the self stabilized/dispersed resin. Other useful monomers are styrene, acrylonitrile, methacrylonitrile, acrylamide, methacrylamide, perfluoro alkyl methacrylates or acrylates, dicarboxylic acids such as itaconic acid and the like.

Typical solvents and diluents are used to form the above polymers and thee resulting coating composition. Appropriate solvents are chosen to form polymer solutions or dispersions and appropriate diluents are chosen to form coating compositions. Typical solvents and diluents are toluene, xylene, butyl acetate, acetone, methyl isobutyl ketone, methyl ethyl ketone, methanol, isopropanol, butanol, hexane, acetone, ethylene glycol monoethyl ether, VM and P naphtha, mineral spirits, heptane and other aliphatic, cycloaliphatic, aromatic hydrocarbons, esters, ethers and ketones and the like.

The crosslinking agent used in the composition is a fully alkylated melamine formaldehyde resin that preferably is a methylated and butylated melamine formaldehyde resin that has a degree of polymerization of about 1–3. Generally, this melamine formaldehyde resin contains about 50% butylated groups and 50% methylated groups. Typically these crosslinking agents have a number average molecular weight of about 300–600 and a weight average molecular weight of about 500–1500.

It is possible to use other alkylated melamine formaldehyde crosslinking agents. Typically lower alkyl alcohols are used to form these crosslinking agents such as methanol, ethanol, propanol, isopropanol, butanol, isobutanol, hexanol and the like.

Also, urea formaldehyde, benzoquanamine formaldehyde and polyisocyanates may be used as crosslinking agents.

One preferred coating composition contains about 5–75%, by weight of a solution acrylic polymer I of about 5–30% by weight styrene, 10–40% by weight butyl methacrylate, 10–40% by weight butyl acrylate, 15–50% by weight hydroxy ethyl acrylate or hydroxy propyl acrylate and has a weight average molecular weight of about 5,000–15,000; about 5–45% by weight of a self stabilized dispersion resin formed by polymerizing the following constituents:

(1) an acrylic solution Polymer II composed of 5–25% by weight styrene, 20–40% by weight butyl acrylate, 20–40% by weight butyl methacrylate, 5–15% by weight hydroxy ethyl acrylate, 1–5% by weight acrylic acid 10–20% by weight ethyl methacrylate and having a weight average molecular weight of about 7,000–15,000 and (2) monomers of styrene, methyl methacrylate hydroxy ethyl acrylate, methacrylic acid, methyl acrylate and glycidyl methacrylate;

(3) an acrylic solution polymer II wherein the carboxyl groups of the acrylic acid are post reacted with glycidyl methacrylate and 25–50% by weight of a fully methylated and butylated melamine formaldehyde crosslinking agent.

Generally, an acid catalyst is used in the coating composition to enhance crosslinking of the components on curing. About 0.1–2% by weight, based on the weight of the composition, of catalyst can be used. Typically, blocked aromatic sulfonic acids are used. One preferred blocked acid catalyst is dodecyl benzene sulfonic acid blocked with dimethyl oxazolidine. Other acid catalysts that can be used are sulfonic acid, para-toluene sulfonic aid, dinonyl naphthalene sulfonic acid and the like.

To improve weatherability of the clear finish of the coating composition, about 0.1–5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1–5% by weight, based on the weight of the binder, of an antioxidant can be added.

Typical ultraviolet light stabilizers that are useful are as follows:

Benzophenones such as hydroxydodecyclbenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4'-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'-methyphenyl)benzotriazole, 2-(2'hydroxyphenyl)benzotriazole, 2-(2'-hydroxy-5'-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-tbutyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlenesubstituted oxalic acid diamides, methyl-$\beta$-(3,5-di-t-butyl-4-hydroxyphenyl)propionate, $\alpha,\alpha'$-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenyl-phosphinothioyl)disulfide, 4-benzoyl-6-(dialkylhydroxybenzyl)resorcinol, bis(3-hydroxy-4-benzoylphenoxy)-diphenylsilane, bis(3-hydroxy-4-benzoylphenoxy)dialkylsilane, 1,8-naphthalimides, $\alpha$-cyano-$\beta,\beta$-diphenylacrylic acid derivatives, bis(2-benzoxazolyl)alkanes, bis(2-naphthoxazolyl)alkanes, methylene malonitriles containing aryl and heterocyclic substitutes, alkylenebis(dithio)carbamate, 4-benzoyl-3-hydroxyphenoxyethyl acrylate. 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl-1,3,8-triazaspiro(4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-Phenyl-3-methyl-4-decanoylpyrazolate(5)]-Ni, bis[phenyldithiocarbamato]-Ni(II), and others listed in the above Patent, column 8, line 44 through line 55.

The following blend of ultraviolet light stabilizers is particularly preferred 2-[2'-hydroxy-3',5'-1(1-1-dimethyl-propyl)phenyl]benzotriazole and bis-[4-(1,2,2,6,6-pentamethylpiperidyl)]2-butyl-2-[(3,5-t-butyl-4-hydroxyphenyl)methyl]propanedioate. The stabilizers can be used in any ratio however, a 1:1 ratio of benzotriazole to propanedioate is preferred.

Another useful blend of ultraviolet light stabilizers is 2-(benzotriazole-2-VL)-4,6-bis(methylethyl-1-phenyl ethyl)phenol, and 2(3 hydroxy-3,5'-ditert amyl phenyl)-benxotriazole.

Generally, the clear coating composition of this invention is applied by conventional spraying techniques to a color or base coat of an automobile or truck and then is baked. Preferably, electrostatic spraying is used to apply the composition. The coatings are baked at about 80° to 200° C. for about 10 to 60 minutes. The resulting clear coat is about 1–5 mils thick preferably 1–2 mils thick and has excellent gloss, good adhesion to the color coat and excellent weatherability.

The following examples illustrate the invention. All parts and percentages are on a weight basis unless otherwise indicated. The weight average molecular weight of polymers was determined by GPC (gel permeation chromatography) using polymethyl methacrylate as a standard.

EXAMPLE 1

A nonaqueous acrylic resin dispersion was prepared by charging the following constituents into a reaction vessel equipped with a stirrer, a heating source and a reflux condenser:

|  | Parts by Weight |
|---|---|
| Portion 1 | |
| Isopropanol | 179.26 |
| Acrylic Polymer Solution | 2254.05 |
| (52% solids of an acrylic polymer of 15% styrene, 28% butyl methacrylate, 30% butyl acrylate, 10% hydroxy ethyl acrylate, 2% acrylic acid and 15% ethyl methacrylate having a weight average Mw of 10,000 in a solvent mixture of 82.2% xylene and 17.8% butanol) | |
| Mineral spirits | 255.65 |
| Heptane | 1912.46 |
| Portion 2 | |
| Heptane | 28.75 |
| t-butyl peroctoate | 4.68 |
| Portion 3 | |
| Methylmethacrylate monomer | 1459.69 |
| Hydroxyethyl acrylate monomer | 784.81 |
| Styrene monomer | 156.97 |
| Portion 4 | |
| Acrylic Polymer solution (53% solids of an acrylic polymer of 15% styrene, 28% butyl methacrylate, 30% butyl acrylate, 10% hydroxy ethyl acrylate, 2% acrylic acid and 15% ethyl methacrylate 2.7% glycidyl methacrylate having a weight average MW of 10,000 in a solvent mixture of 82.2% xylene and 17.8% butanol) | 1126.52 |
| Methyl methacrylate monomer | 125.57 |
| Methyl acrylate monomer | 565.06 |

|  | Parts by Weight |
|---|---|
| -continued | |
| Glycidyl methacrylate monomer | 47.05 |
| Heptane | 17.25 |
| Portion 5 | |
| Mineral Spirits | 638.63 |
| t-butyl peroctoate | 47.14 |
| Isobutanol | 127.31 |
| Portion 6 | |
| t-butyl peroctoate | 30.96 |
| Isobutanol | 255.65 |
| Portion 7 | |
| Heptane | 167.25 |
| Total | 10,184.71 |

Portion 1 is charged into the reaction vessel and heated to its reflux temperature Portion 2 is added to the reaction vessel mixed and held at reflux temperature for 2 minutes. Then portions 3 and 4 are added simultaneously with portions 5 over a 210 minute period to the reaction vessel while maintaining the resulting reaction mixture at its reflux temperature. Then the mixture is held at its reflux temperature for an additional 45 minutes. Portion 6 is added over a 90 minute period while maintaining the reaction mixture at its reflux temperature and then held at this temperature for an additional 90 minutes. Portion 7 is added and excess solvent is stripped off to give a 60% solids acrylic resin dispersion.

A coating composition was prepared by blending together the following constituents:

|  | Parts by Weight |
|---|---|
| Portion 1 | |
| Xylene | 163.00 |
| 2(3-hydroxy-3,5'-ditert amylphenyl)benzotriazole | 113.20 |
| Hindered amine U.V. light stabilizer solution [40% solution in xylene of 8-acetyl-3-dodecyl-7,7,9,9-tetramethyl 2,3,8-triazaspiro(4,5)decane-2,4 dione] | 147.80 |
| Baysilon Oil Solution (72.8 parts Baysilone Fluid OL and 655.2 parts xylene) | 4.10 |
| Portion 2 | |
| Methylated/butylated melamine formaldehyde resin (fully butylated and methylated melamine formaldehyde resin having a butyoxy/methoxy ratio of 1:1 and a degree of polymerization of about 1–1.2) | 2068.50 |
| Acrylic resin solution (75% solids in naphtha solvent of an acrylic resin of 15% styrene, 30% butyl methacrylate, 25% butylacrylate; 30% hydroxy ethyl acrylate having a weight average Mw of 6,000) | 4054.30 |
| Blocked sulfonic acid Solution (33% solids in methanol of dodecyl benzene sulfonic acid blocked with dimethyl oxazolidine, molar ratio of acid; dimethyl oxazolidine is 1.52:1) | 236.40 |
| Nonaqueous Acrylic resin dispersion (prepared above) | 985.40 |
| Portion 3 | |
| Methanol | 203.80 |
| Methylamyl ketone | 458.50 |

| | Parts by Weight |
|---|---|
| Total | 8435.00 |

The constituents of Portion 1 were added in the order shown to a mixing vessel and agitated until in solution. Portion 2 was added to the vessel and mixed for 30 minutes. Portion 3 was added and mixed for 30 minutes. The resulting clear coating composition had 70% solids content.

The resulting composition was sprayed onto primer coated phosphatized steel panels that were coated with a pigmented acrylic base coat. The composition was sprayed onto the panels before the base coat was baked. The panels were baked at 120° C. for 30 minutes and a clear coat about 2 mils thick was formed on each panel. The clear coating had a hardness of 8 knoops, a gloss measured at 20 degrees of 95. The coating had excellent outdoor weatherability.

EXAMPLE 2

A coating composition was prepared that was identical to the coating composition of Example 1 except the following acrylic resin solution was used in the preparation of the coating composition:

Acrylic resin solution (71% solids in xylene and aromatic hydrocarbon solvent mixture of an acrylic resin of 15% styrene, 30% butyl methacrylate, 17% butyl acrylate and 38% hydroxy propyl acrylate and has a weight average molecular weight of about 6,000).

The resulting clear coating composition was sprayed onto primer coated phosphatized steel panels that were coated with a pigmented acrylic base coat as in Example 1 and baked as in Example 1. The resulting coating was about 2 mils thick and had the same hardness and gloss as the coating composition of Example 1 and had excellent outdoor weatherability.

We claim:

1. A coating composition comprising about 20–85% by weight of film forming binder and 15–80% by weight of an organic liquid carrier:
   (a) an acrylic polymer I consisting essentially of polymerized monomers of alkyl methacrylate, alkyl acrylate and hydroxy alkyl acrylate or methacrylate and having a weight average molecular weight of about 3,000 to 20,000;
   (b) a self stabilized dispersed resin formed by polymerizing in solution the following constituents:
      (1) an acrylic polymer II consisting essentially of polymerized monomers comprising alkyl methacrylate, alkyl acrylate, hydroxy alkyl acrylate or methacrylate, an ethylenically unsaturated carboxylic acid and having a weight average molecular weight of 3,000 to 20,000.
      (2) monomers comprising alkyl methacrylate, alkyl acrylate and hydroxy alkyl acrylate or methacrylate; wherein either acrylic polymer II contains glycidyl methacrylate or acrylate monomers post reacted with the carboxylic acid or the monomers contain glycidyl methacrylate or acrylate;
   (c) an alkylated melamine formaldehyde crosslinking agent;

wherein the molecular weight of each of the polymers is determined by gel permeation chromatography using polymethyl methacrylate as the standard.

2. The coating composition of claim 1 comprising about 50–80% by weight of film forming binder and 20–50% by weight of organic solvent for the binder.

3. The coating composition of claim 2 wherein the binder comprises:
   (a) 5–75% by weight, based on the weight of the binder, of acrylic polymer I,
   (b) 5–45% by weight, based on the weight of the binder, of self stabilized dipsersion resin and
   (c) 20–50% by weight, based on the weight of the binder, of an alkylated melamine formaldehyde crosslinking agent.

4. The coating composition of claim 3 in which acrylic polymer I consists essentially of polymerized monomers of styrene, alkyl methacrylate, alkyl acrylate, hydroxy alkyl acrylate or methacrylate.

5. The coating composition of claim 4 in which acrylic polymer I consists essentially of polymerized monomers of about 5–30% by weight styrene, 10–40% by weight of butyl methacrylate, 10–40% by weight of butyl acrylate and 15–50% by weight of hydroxy ethyl acrylate or hydroxy propyl acrylate and has a weight average molecular weight of about 5,000–15,000.

6. The coating composition of claim 4 in which the acrylic polymer I contains additionally about 0.1–5% by weight of acrylic acid or methacrylic acid.

7. The coating composition of claim 3 in which acrylic polymer II consists essentially of polymerized monomers of styrene, alkyl methacrylate, alkyl acrylate, hydroxy alkyl acrylate or methacrylate and acrylic acid or methacrylic acid.

8. The coating composition of claim 7 in which acrylic polymer II was post reacted with glycidyl methacrylate.

9. The coating composition of claim 7 in which the acrylic polymer II consists essentially of 5–25% by weight styrene, 20–40% by weight butyl methacrylate, 20–40% by weight butyl acrylate, 5–15% by weight hydroxy ethyl acrylate, 1–5% by weight acrylic acid, 10–20% by weight ethyl methacrylate and having a weight average molecular weight of about 7,000–15,000.

10. The coating composition of claim 8 in which the acrylic polymer II consists essentially of 5–25% by weight styrene, 25–35% by weight butyl methacrylate, 20–40% butyl acrylate, 5–15% by weight hydroxy ethyl acrylate, 1–5% by weight acrylic acid, 10–20% by weight ethyl methacrylate and 1–5% by weight glycidyl methacrylate post reacted with acrylic acid and having a weight average molecular weight of 7,000 to 15,000.

11. The coating composition of claim 3 in which the monomers of the self stabilized dispersion resin comprise styrene, methyl methacrylate, hydroxy ethyl acrylate, methacrylic acid, methyl acrylate and glycidyl methacrylate.

12. The coating composition of claim 3 containing in addition about 0.1–2% by weight, based on the weight of the coating composition, of an acid catalyst.

13. The coating composition of claim 3 in which the alkylated melamine formaldehyde crosslinking agent is about 50% methylated and 50% butylated.

14. The coating composition of claim 3 containing in addition about 0.1–5% by weight, based on the weight of the binder of an ultraviolet light stabilizer.

15. The coating composition of claim 1 which comprises 50-80% by weight of film forming binder and 20-50% by weight of an organic solvent for the binder; wherein the binder consists essentially of about
  (a) 5-75% by weight of a solution acrylic Polymer I consisting of essentially of about 5-30% by weight styrene, 10-40% by weight butyl methacrylate, 10-40% by weight butyl acrylate, 15-50% by weight hydroxy ethyl acrylate or hydroxy propyl acrylate and having a weight average molecular weight of about 5,000-15,000;
  (b) 5-45% by weight of a self stabilized dispersed resin formed by polymerizing in solution the following constituents:
    (1) an acrylic solution Polymer II consisting essentially of 5-25% by weight styrene, 20-40% by weight butyl acrylate, 20-40% by weight butyl methacrylate, 5-15% by weight hydroxy ethyl acrylate, 1-5% by weight acrylic acid 10-20% by weight ethyl methacrylate and having a weight average molecular weight of about 7,000-15,000;
    (2) monomers of styrene, methyl methacrylate hydroxy ethyl acrylate, methacrylic acid, methyl acrylate and glycidyl methacrylate;
    (3) an acrylic solution polymer II wherein the carboxyl groups of the acrylic acid monomers are post reacted with glycidyl methacrylate;
  (c) 25-40% by weight of a fully methylated and butylated melamine formaldehyde crosslinking agent.

16. A substrate coated with a cured layer of the composition of claim 1.

17. A substrate coated with a layer of a pigmented paint composition and having a layer in adherence to thereto of the composition of claim 1.

* * * * *